(12) United States Patent
Goldenberg et al.

(10) Patent No.: US 8,713,467 B1
(45) Date of Patent: Apr. 29, 2014

(54) CONTEXT-SENSITIVE VIEWS

(71) Applicant: Palantir Technologies, Inc., Palo Alto, CA (US)

(72) Inventors: Joshua Goldenberg, Menlo Park, CA (US); Brian Ngo, San Francisco, CA (US); Bill Dwyer, Palo Alto, CA (US); Parvathy Menon, San Francisco, CA (US); Gregory Martin, Oakland, CA (US); Zach Bush, Palo Alto, CA (US); Allen Chang, Mountain View, CA (US); Mike Boland, McLean, VA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 14/095,798

(22) Filed: Dec. 3, 2013

Related U.S. Application Data

(60) Provisional application No. 61/864,048, filed on Aug. 9, 2013.

(51) Int. Cl.
*G06F 3/048* (2013.01)
*G06F 3/00* (2006.01)

(52) U.S. Cl.
USPC ............................ 715/781; 715/772; 715/716

(58) Field of Classification Search
USPC ......................................... 715/781, 772, 716
See application file for complete search history.

(56) References Cited

U.S. PATENT DOCUMENTS

| | | | |
|---|---|---|---|
| 6,232,971 B1 | 5/2001 | Haynes | |
| 6,369,835 B1 | 4/2002 | Lin | |
| 6,839,745 B1 * | 1/2005 | Dingari et al. | 709/219 |
| 7,139,800 B2 * | 11/2006 | Bellotti et al. | 709/206 |
| 7,379,903 B2 * | 5/2008 | Caballero et al. | 705/26.4 |
| 7,426,654 B2 * | 9/2008 | Adams et al. | 714/4.3 |
| 7,454,466 B2 * | 11/2008 | Bellotti et al. | 709/206 |
| 7,467,375 B2 * | 12/2008 | Tondreau et al. | 717/137 |
| 7,525,422 B2 * | 4/2009 | Bishop et al. | 340/522 |
| 7,617,232 B2 | 11/2009 | Gabbert et al. | |

(Continued)

FOREIGN PATENT DOCUMENTS

WO    WO 2010/030913    3/2010

OTHER PUBLICATIONS

"A First Look: Predicting Market Demand for Food Retail using a Huff Analysis," TRF Policy Solutions, Jul. 2012, pp. 30.

(Continued)

*Primary Examiner* — David Phantana Angkool
(74) *Attorney, Agent, or Firm* — Knobbe, Martens, Olson & Bear LLP

(57) ABSTRACT

A context-sensitive viewing system is disclosed in which various data visualizations, also referred to a contextual views, of a common set of data may be viewed by a user on an electronic device. Data in the system may comprise data objects and associated properties and/or metadata, and may be stored in one or more electronic data stores. As a user of the system views and manipulates a first contextual view of a set of data objects, one or more other contextual views of the same set of data objects may be updated accordingly. Updates to the secondary contextual views may, in various embodiments, happen real-time. Further, the secondary contextual views may be visible to the user simultaneously with the primary contextual view. A user may switch from one view to another, and may manipulate data in any view, resulting in updates in the other views.

18 Claims, 11 Drawing Sheets

(56) References Cited

U.S. PATENT DOCUMENTS

| | | | |
|---|---|---|---|
| 7,703,021 | B1 | 4/2010 | Flam |
| 7,716,077 | B1* | 5/2010 | Mikurak ............... 705/7.12 |
| 7,818,658 | B2 | 10/2010 | Chen |
| 8,514,082 | B2* | 8/2013 | Cova et al. ............ 340/572.1 |
| 8,554,579 | B2* | 10/2013 | Tribble et al. ............ 705/3 |
| 2005/0028094 | A1 | 2/2005 | Allyn |
| 2005/0125715 | A1 | 6/2005 | Di Franco et al. |
| 2006/0080619 | A1 | 4/2006 | Carlson et al. |
| 2006/0129746 | A1 | 6/2006 | Porter |
| 2007/0266336 | A1 | 11/2007 | Nojima et al. |
| 2008/0077597 | A1 | 3/2008 | Butler |
| 2010/0070897 | A1 | 3/2010 | Aymeloglu et al. |
| 2011/0167105 | A1* | 7/2011 | Ramakrishnan et al. ..... 709/203 |
| 2012/0246148 | A1* | 9/2012 | Dror ............... 707/722 |

OTHER PUBLICATIONS

Ananiev et al., "The New Modality API," http://web.archive.org/web/20061211011958/http://java.sun.com/developer/technicalArticles/J2SE/Desktop/javase6/modality/ Jan. 2006, pp. 8.

Bugzilla@Mozilla, "Bug 18726—[feature] Long-click means of invoking contextual menus not supported," http://bugzilla.mozilia.org/show_bug.cgi?id=18726 printed Jun. 13, 2013 in 11 pages.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Griffith, Daniel A., "A Generalized Huff Model," Geographical Analysis, Apr. 1982, vol. 14, No. 2, pp. 135-144.

Hibbert et al., "Prediction of Shopping Behavior Using a Huff Model Within a GIS Framework," Healthy Eating in Context Mar. 18, 2011, pp. 16.

Huff et al., "Calibrating the Huff Model Using ArcGIS Business Analyst," ESRI, Sep. 2008, pp. 33.

Huff, David L., "Paramater Estimation in the Huff Model," ESRI, ArcUser, Oct.-Dec. 2003, pp. 34-36.

International Search Report and Written Opinion in Application No. PCT/US2009/056703, dated Mar. 15, 2010.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Manske, "File Saving Dialogs," http://www.mozilla.org/editor/ui_specs/FileSaveDialogs.html, Jan. 20, 1999, pp. 7.

Microsoft Office—Visio, "About connecting shapes," http://office.microsoft.com/en-us/visio-help/about-connecting-shapes-HP085050369.aspx printed Aug. 4, 2011 in 6 pages.

Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.

* cited by examiner

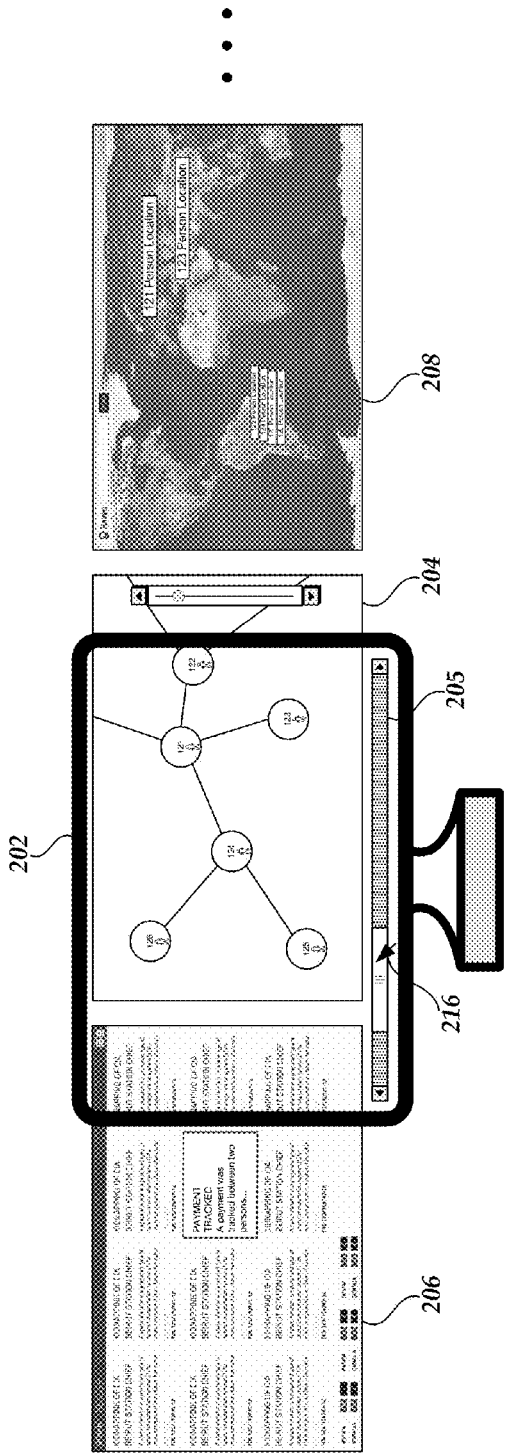
FIG. 2B
FIG. 2C
FIG. 2D

006
CONTEXT-SENSITIVE VIEWS

CROSS-REFERENCE TO RELATED APPLICATIONS

This application claims a priority benefit under 35 U.S.C. §119 to U.S. Provisional Patent Application No. 61/864,048, filed on Aug. 9, 2013, and titled "CONTEXT-SENSITIVE VIEWS," which is hereby incorporated by reference herein in its entirety.

TECHNICAL FIELD

The present disclosure relates to systems and techniques for data integration, analysis, and visualization. More specifically, the present disclosure relates to integration, analysis, and visualization of data objects in various contextual views.

BACKGROUND

Visualizations may enable faster and more thorough understandings of sets of data and information. Such visualizations of data and other information may be referred to as data visualizations. Data visualizations may, for example, visually transform and/or restructure data so as to provide new perspectives to a viewer of the visualization. A particular type of data visualization may be referred to as a contextual view. Examples of data visualizations include graphs, maps, tables, and/or lists, among others. Data visualizations may include displaying individual pieces of data in, for example, various arrangements, various sizes, various colors, and/or may include multi-dimensional aspects.

SUMMARY

The systems, methods, and devices described herein each have several aspects, no single one of which is solely responsible for its desirable attributes. Without limiting the scope of this disclosure, several non-limiting features will now be discussed briefly.

A context-sensitive viewing system is disclosed in which various data visualizations, also referred to a contextual views, of a common set of data may be viewed by a user on an electronic device. Data in the context-sensitive viewing system may comprise data objects and associated properties and/or metadata. As a user of the system views and manipulates a first contextual view of a set of data objects, one or more other contextual views of the same set of data objects may be updated accordingly.

In various embodiments, a user of the context-sensitive viewing system may switch from a primary contextual view to a secondary contextual view, thereby making the switched-to contextual view the new primary contextual view. Data objects may be manipulated in any view, resulting in updates in the other views. Context switching may be accomplished through inputs from the user. For example, the user may click on a preview of a secondary view, and/or may scroll from one view to the next.

The context-sensitive viewing system advantageously enables a user to view a particular set of data objects in multiple visualization contexts. Previews of the set of data in other visualization may be quickly reviewed by the user to determine the most beneficial context for information extraction. Further, manipulations by the user in one context are propagated to the other contexts, allowing fast analysis of the impacts of changes to the set of data.

In an embodiment, a computer system is disclosed comprising one or more hardware processors in communication with a computer readable medium storing software modules including instructions that are executable by the one or more hardware processors, the software modules including at least: an electronic database configured to store a plurality of data objects and properties associated with each of the data objects; and a context viewing module configured to: generate a primary contextual view including a visualization of a set of data objects and associated properties; generate one or more secondary contextual views, each secondary contextual view including respective secondary visualizations of the set of data objects; receive a user input modifying the primary contextual view; and in response to receiving a user input modifying the primary contextual view, modify one or more of the secondary contextual views based at least in part on the user input.

According to an aspect, the context viewing module may be further configured to: in response to receiving a user input modifying the primary contextual view, determine which of the one or more of the secondary contextual views to modify.

According to an aspect, modifying one or more of the secondary contextual views may comprise modifying all of the one or more secondary contextual view.

According to an aspect, modifying one or more of the secondary contextual views may comprise modifying any of the one or more secondary contextual views that are currently viewable by a user.

According to an aspect, modifying one or more of the secondary contextual views may comprise modifying any of the one or more secondary contextual views that are immediately adjacent to the primary contextual view.

According to an aspect, each of the visualization and/or the secondary visualizations may include at least one of a graph, a map, a table, a timeline, a histogram, a list, a reader interface, or a postboard interface.

According to an aspect, the one or more secondary contextual views may comprise contextual previews.

According to an aspect, the one or more secondary contextual views may be viewable in a drawer or scrollbar on a user interface, and the one or more secondary contextual views may be selectable by a user.

According to an aspect, the one or more secondary contextual views may be substantially the same size as the primary contextual view.

According to an aspect, the one or more secondary contextual views may be configured to be accessible by a user through the use of a scrollbar.

According to an aspect, the scrollbar may include at least one of tick marks indicating the locations of the one or more secondary views or contextual previews accessible in pop up windows.

According to an aspect, the one or more secondary contextual views may be positioned laterally to the primary contextual view, and the secondary contextual views may be accessible by a user through a user input including at least one of a mouse cursor or a touch input.

According to an aspect, a user input modifying the primary contextual view may comprise at least one of adding data objects, removing data objects, modifying data objects, moving data objects, modifying properties associated with data objects, or modifying and/or manipulating links between data objects.

In an embodiment, a computer system is disclosed comprising one or more hardware processors in communication with a computer readable medium storing software modules including instructions that are executable by the one or more hardware processors, the software modules including at least: a context viewing module configured to: display a first data visualization of a set of data objects and properties associated with data objects of the set of data objects; provide one or more secondary data visualizations of the set of data objects; receive a user input modifying the first data visualization; and in response to receiving a user input modifying the first data visualization, implement modifications to at least some of the one or more secondary data visualizations based at least in part on the user input.

According to an aspect, the context viewing module may be further configured to: in response to receiving a user input modifying the modifying the first data visualization, determine which of the one or more of the secondary data visualizations are currently displayed to the user, and implement modifications to the determined secondary data visualizations based at least in part on the user input.

According to an aspect, the context viewing module may be further configured to: in response to receiving a user input modifying the modifying the first data visualization, determine which of the one or more of the secondary data visualizations are adjacent to the first data visualization, and implement modifications to the determined secondary data visualizations based at least in part on the user input.

In an embodiment, a computer-implemented method of updating multiple contextual views is disclosed, the method comprising: providing an electronic database configured to store a plurality of data objects and metadata associated with each of the plurality of data objects; generating, by a computing system having one or more computer processors, based at least in part on the plurality of data objects and associated metadata, a primary contextual view and one or more secondary contextual views; receiving, via an input device of the computing system, a user input modifying the primary contextual view; determining, by the computing system, based on the received user input, modifications of the one or more secondary contextual views that correspond to the modification of the primary contextual view; modifying at least some of the one or more secondary contextual views based on the determined modifications.

According to an aspect, the method may further comprise providing, on an electronic display of the computing system, the generated primary contextual view and one or more of the secondary contextual views in a preview drawer.

According to an aspect, the method may further comprise providing, on an electronic display of the computing system, the generated primary contextual view; and providing, on the electronic display of the computer system, a scrollbar that enables a user to scroll to any of the one or more of the secondary contextual views and view any of the one or more of the secondary contextual views on the electronic display.

According to an aspect, modifying at least some of the one or more secondary contextual views based on the determined modifications may comprise modifying any secondary contextual views that are immediately viewable by a user.

BRIEF DESCRIPTION OF THE DRAWINGS

FIGS. 2A and 2B illustrate another user interface of the context-sensitive viewing system including multiple contextual views, according to embodiments of the present disclosure.

FIGS. 2C and 2D illustrate scrollbar aspects of user interfaces of the context-sensitive viewing system, according to embodiments of the present disclosure.

DETAILED DESCRIPTION OF SPECIFIC EMBODIMENTS

Overview

Figure 1A:
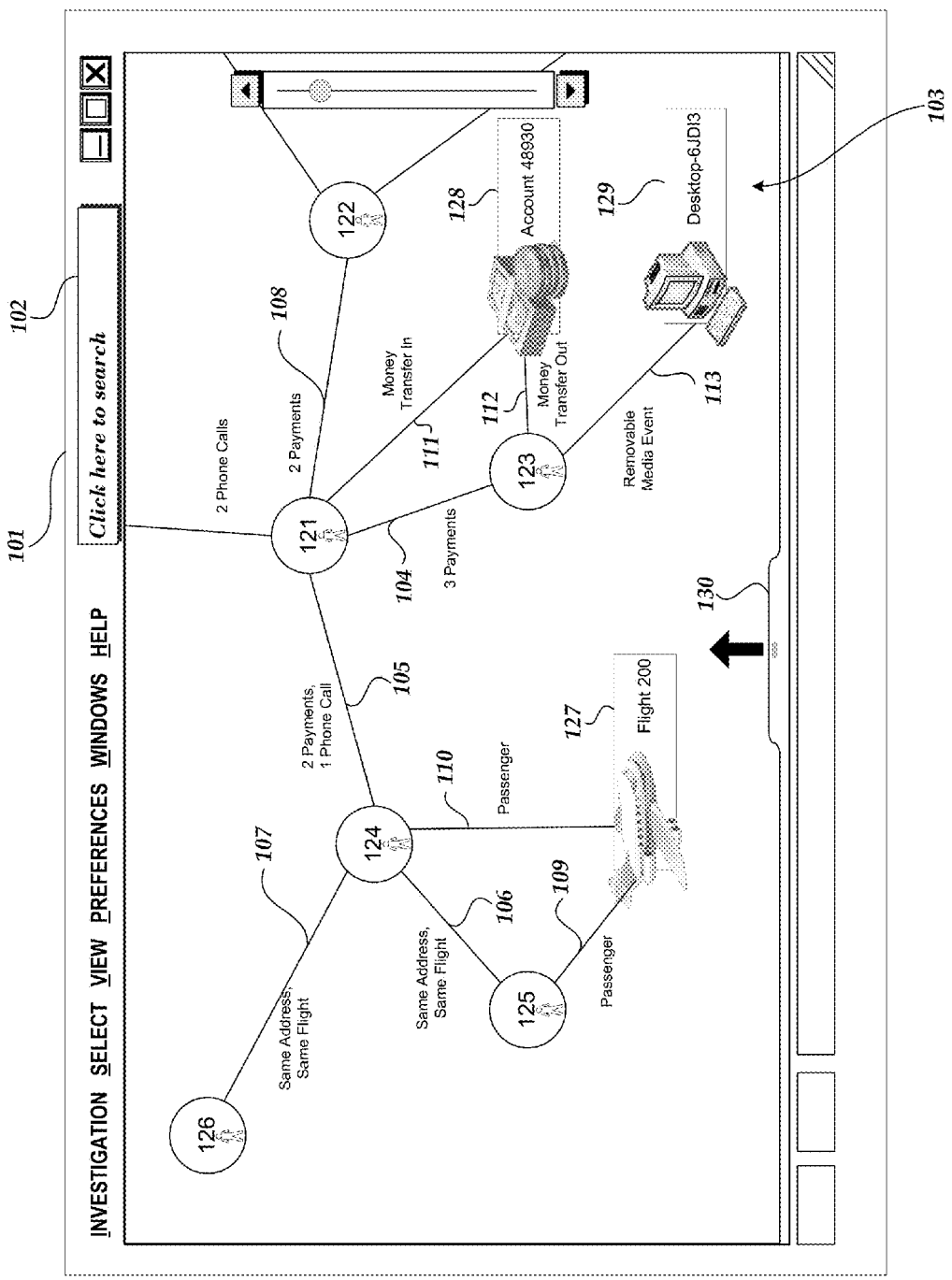
FIG. 1A illustrates a user interface of a context-sensitive viewing system, including relationships described in a data store using a dynamic ontology, according to an embodiment of the present disclosure.

A context-sensitive viewing system is disclosed in which various data visualizations, also referred to a contextual views, of a common set of data may be viewed by a user on an electronic device. Data in the context-sensitive viewing system may comprise data objects and associated properties and/or metadata, and may be stored in one or more electronic data stores. As a user of the system views and manipulates a first contextual view (also referred to as the "primary contextual view") of a set of data objects, one or more other contextual views (also referred to as "secondary contextual views") of the same set of data objects may be updated accordingly.

Updates to the secondary contextual views may, in various embodiments, happen real-time or may happen upon the occurrence of a triggering event (for example, a user input). In various embodiments, the secondary contextual views may comprise previews and/or thumbnails. Further, the secondary contextual views may be visible to the user simultaneously with the primary contextual view. For example, the user of the context-sensitive viewing system may view a particular set of data objects in multiple visualization contexts. Further, as the user updates the set of data objects in one context, the set of data objects may automatically be updated in one or more secondary contexts.

For the sake of brevity, contextual views may be referred to herein simply as "views" or "contexts." For example, a primary contextual view may be referred to as a "primary view." Additionally, the terms "contextual view" and "data visualization" may be used interchangeably.

In various ways and in various embodiments, a user of the context-sensitive viewing system may switch from a primary contextual view to a secondary contextual view, thereby making the switched-to contextual view the new primary contextual view. Data objects may be manipulated in any view, resulting in updates in the other views. Context switching may be accomplished through inputs from the user. For example, the user may click on a preview of a secondary view, and/or may scroll from one view to the next.

Examples of contextual views (and/or data visualizations) of the context-sensitive viewing system include, but are not limited to graphs, maps, tables, timelines, histograms, and/or lists, among other types of data visualizations. In an embodiment, a contextual view comprises a graph of connected data objects as described below. In an embodiment, a contextual view comprises an interactive mapping application, an example of which is described in U.S. patent application Ser. No. 13/917,571 filed on Jun. 13, 2013, and titled "Interactive Geospatial Map," which is hereby incorporated by reference herein in its entirety and for all purposes. In an embodiment, a contextual view comprises a reader interface that enables a user to review large amounts of notes and other textual information. An example of such a reader interface is described in U.S. Provisional Patent Application No. 61/863,792, filed on Aug. 8, 2013, and titled "Cable Reader Labeling,", which is hereby incorporated by reference herein in its entirety and for all purposes. In an embodiment, a contextual view comprises a postboard view in which notes and textual clips may be listed, an example of which is described in U.S. Provisional Patent Application No. 61/863,814, filed on Aug. 8, 2013, and titled "Cable Reader Snippets and Postboard," which is hereby incorporated by reference herein in its entirety and for all purposes. In an embodiment, a contextual view comprises a time series graph, timeline, and/or histogram, examples of which are described in U.S. Pat. No. 8,280,880, titled "Generating Dynamic Date Sets That Represent Market Conditions," and U.S. Pat. No. 8,280,880, titled "Filter Chains With Associated Views For Exploring Large Data Sets," each of which is hereby incorporated by reference herein in its entirety and for all purposes.

DEFINITIONS

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. The definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Contextual view, context, view, data representation: A visual representation of data that may include various organizations, transformations, and/or restructuring of data so as to provide new perspectives to a viewer of the visualization. Examples of contexts include graphs, maps, tables, timelines, histograms, and/or lists, among others. Contextual views may include displaying individual pieces of data in, for example, various arrangements, various sizes, various colors, and/or may include multi-dimensional aspects. Contextual views may enable faster and more thorough understandings of sets of data and information.

Example User Interfaces

FIG. 1A illustrates a user interface 101 of a context-sensitive viewing system, according to an embodiment of the present disclosure. The user interface 101 may be displayed on, for example, an electronic display of the system, such as client device 402 of FIG. 4. Further, as is described in detail below, a user may provide inputs to the system through, for example, a mouse and pointer or through a touch interface.

The example user interface 101 includes a particular graphical contextual view and/or data visualization 103 of various data objects and relationships between those data objects. In the example user interface 101 of FIG. 1A, a single contextual view is provided that shows, properties, data objects, and links/relationships between the data objects using a graphical user interface (GUI). The data objects shown on the user interface 101 include, for example, person objects 121, 122, 123, 124, 125, and 126; a flight object 127; a financial account 128; and a computer object 129. The data objects are represented by nodes. The relationships and/or links between the various data objects of user interface 101 are represented by lines, and include links 104, 105, 106, 107, 108, 109, 110, 111, 112, and 113.

In this example contextual view 103, each person node (associated with person data objects), flight node (associated with flight data objects), financial account node (associated with financial account data objects), and computer node (associated with computer data objects) may have relationships and/or links with any of the other nodes through, for example, other objects such as payment objects. As is described in detail in reference to FIGS. 4A and 4B below, the various data objects, data object properties, and/or relationships among those data objects and properties may be stored in, and retrieved from, one or more data stores and/or databases. As is further described in detail in reference to FIGS. 5 and 6 below, the data objects data object properties, and/or relationships may be stored using a dynamic ontology.

Turning back to FIG. 1A, various example relationships between data objects are represented. For example, relationship 104 is based on a payment associated with the individuals indicated in person data objects 121 and 123. The link 104 represents these shared payments (for example, the individual associated with data object 121 may have paid the individual associated with data object 123 on three occasions). The relationship is further indicated by the common relationship between person data objects 121 and 123 and financial account data object 128. For example, link 111 indicates that person data object 121 transferred money into financial account data object 128, while person data object 123 transferred money out of financial account data object 128. In another example, the relationships between person data objects 124 and 125 and flight data object 127 are indicated by links 106, 109, and 110. In this example, person data objects 124 and 125 have a common address and were passengers on the same flight data object 127. In an embodiment, further details related to the relationships between the various objects may be displayed. For example, links 111 and 112 may, in some embodiments, indicate the timing of the respective money transfers. In another example, the time of the flight associated with the flight data object 127 may be shown.

Relationships between data objects may be stored as links, or in some embodiments, as properties, where a relationship may be detected between the properties. In some cases the links may be directional. For example, a payment link may have a direction associated with the payment, where one person object is a receiver of a payment, and another person object is the payer of payment.

In addition to visually showing graphical data visualization 103, the user interface 101 may allow various manipulations. For example, the various data objects of the context-sensitive viewing system may be searched using a search interface 102 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. Further, the various data objects represented in the data visualization 103 may be moved, accessed, deleted from the interface, among other manipulations. Additional data objects and associated links may be added to the data visualization 103, and exiting data objects and links may be edited and/or otherwise altered.

The user interface 101 further includes a user-accessible drawer 130. The drawer 130 may be opened or closed by a user of the context-sensitive viewing system. The drawer 130 is shown in a closed state in FIG. 1A. As indicated by an upward pointing arrow, the drawer 130 may be opened by a user clicking and dragging the drawer open and/or touching and pulling the drawer open, as show in FIG. 1B.

Figure 1B:
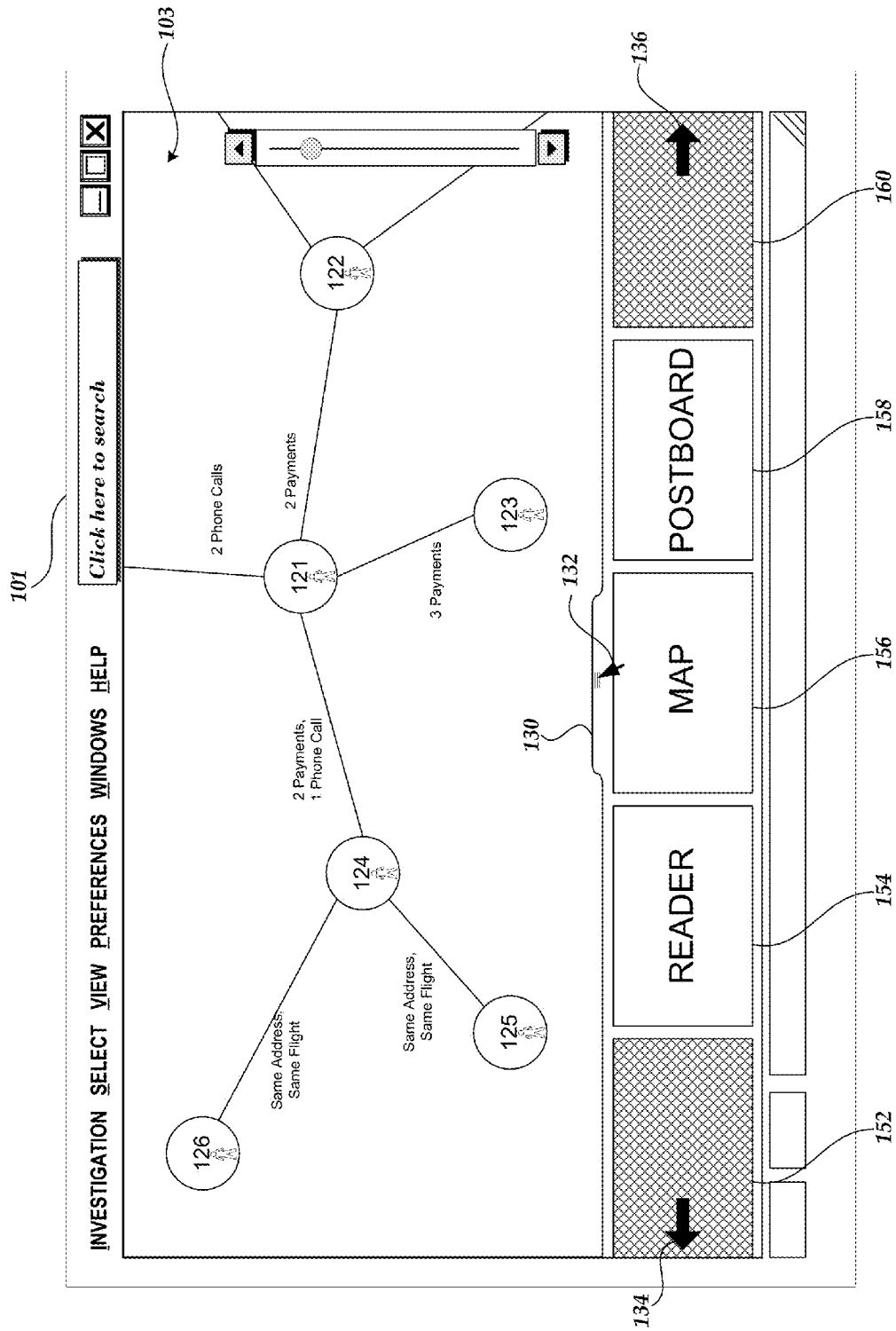
FIG. 1B illustrates a user interface of the context-sensitive viewing system including an expanded drawer with various contextual views, according to an embodiment of the present disclosure.

FIG. 1B illustrates the user interface 101 of the context-sensitive viewing system including an expanded drawer with various contextual views, according to an embodiment of the present disclosure. While including many of the same objects as FIG. 1A, the graphical data visualization 103 of FIG. 1B is simplified for the sake of clarity. As shown, the user has used the mouse pointer 132 to pull open the drawer 130, revealing the contents of the drawer. The drawer 130 includes indications of various available contextual views 152, 154, 156, 158, and 160. Arrows 134 and 136 indicate that, in some embodiment, additional indications of available views may extend beyond those that are currently visible. A user of the context-sensitive viewing system may, in an embodiment, scroll through the indications of views.

In the user interface 101 of FIG. 1B, view indicators include reader view 154, map view 156, and postboard view 158. A user may click on or otherwise select one of the indicators 154, 156, or 158. Selecting one of the views has the effect of changing from the current primary graphical data visualization 103 to the selected view. When the user changes to a different view, the same underlying data set (including data objects, properties, links, and the line) will be used in generating the new view. For example, the user may select the "map" indicator 156, at which point graphical data visualization 103 would be replaced with a map contextual view in which the same data objects (121, 122, 123, 124, 125, 126) may, for example, be placed on the map based on location data associated with the respective data objects.

Figure 1C:
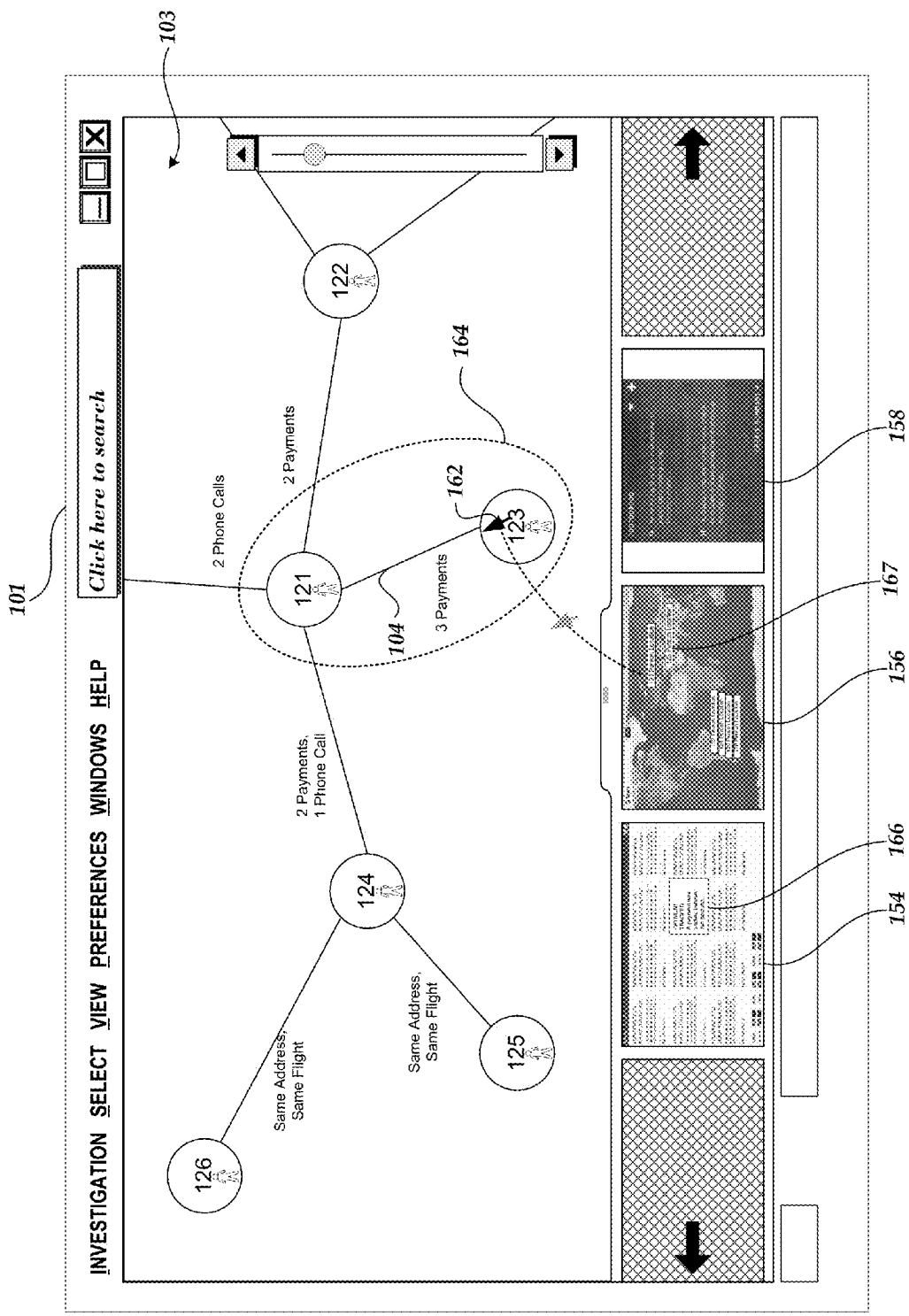
FIGS. 1C and 1D illustrate user interfaces of the context-sensitive viewing system in which selected data objects are updated in various contextual views, according to embodiments of the present disclosure.

In an embodiment, the user may provide an input that causes the indicators 152, 154, 156, 158, 160 to be replaced with previews of the respective contexts (as shown in FIG. 1C). In another embodiment, when the user opens the drawer 130, previews of the respective contexts may be provided automatically.

FIG. 1C illustrates the user interface 101 of the context-sensitive viewing system in which selected data objects are updated in various contextual views, according to an embodiment of the present disclosure. As shown in FIG. 1C, previews and/or thumbnails 154, 156, 158 are provided giving the user a preview of the current data in a reader, map, and postboard context, respectively. The context previews 154, 156, 158 include actual information derived from the data objects currently viewed in the graphical contextual view 103. For example, the map context preview 156 includes the locations of the various person data objects plotted on the map (see, for example, 123 person location 167). The reader context preview 154 includes cables and/or notes related to the data objects and/or links currently shown in the graphical contextual view 103 (see, for example, payment tracked information 166). The postboard context preview 158 includes clippings and/or other user-generated notes associated with the data objects. In various embodiments other contextual previews may be displayed to the user.

As described below in reference to FIG. 3, in various embodiments, the contextual previews may be generated and/or updated when the user opens the drawer 130, before the user opens the drawer 130, when particular previews become visible to the user, when any (or certain) changes are made to one of the views, or at various other times. In some embodiments, one or more contextual views or previews may be updated based on particular criteria, for example, whether the view/preview is visible to the user, whether the view/preview is adjacent to one visible by the user, and the like.

FIG. 1C additionally shows that, in some embodiments, a preview may be updated when the user drags selected objects onto the preview itself. In the example of FIG. 1C, the user has made selection 164, including data objects 121 and 122. Using mouse cursor 162, the user drags the selected objects to the map context preview 156, at which point the map context preview is updated to include the selected objects.

Figure 1D:
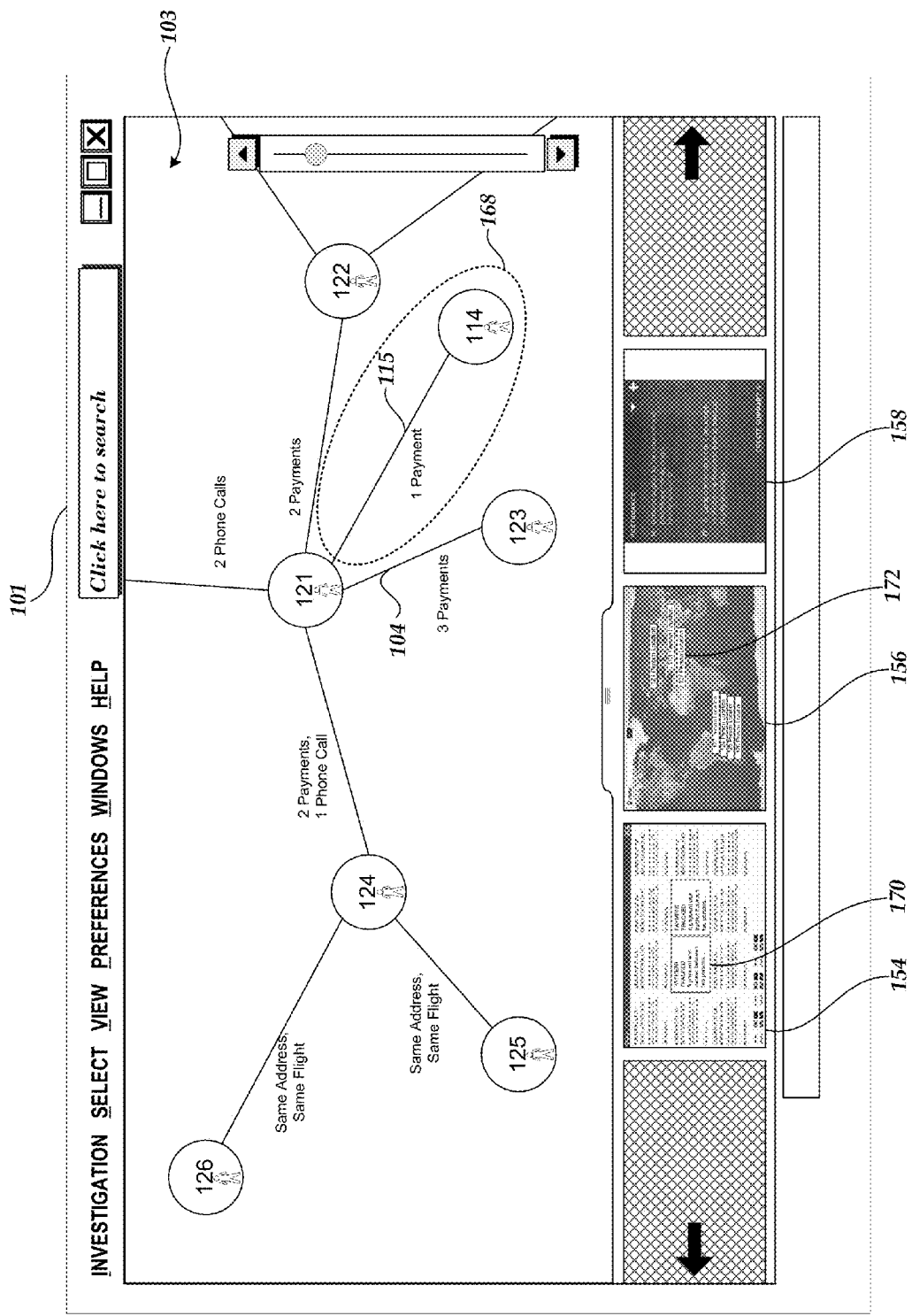

FIG. 1D illustrates the user interface 101 of the context-sensitive viewing system in which added data objects are updated in various contextual views, according to an embodiment of the present disclosure. In the embodiment of FIG. 1D, the user has added person data object 114 to the graphical context/data visualization 103. The added data object 114 includes a link 115 to person data object 121, indicating a payment took place between the objects. By adding the data object 114, the three contextual previews 154, 156, and 158 are automatically updated to reflect the new data object. For example, a location 172 associated with data object 114 is added to the map preview 156, while information 170 regarding the payment link 115 is added to the reader preview 154.

In various embodiments other types of contextual previews may be provided. For example, a timeline context may be provided in which the various event associated with the data objects of graphical primary contextual view 103 may be mapped. In various embodiments, any other types of changes to the primary contextual view may be reflected in the secondary contextual views/previews. For example, removing data object, editing data objects or properties, and the like.

In various embodiments, the drawer 130 may appear at different locations on the user interface 101, and/or may be a different size. For example, the drawer 130 may appear at a top of the user interface, or on either side of the user interface. In an embodiment, the location, size, and/or other appearance of the drawer 130 may be user-configurable.

Figure 2A:
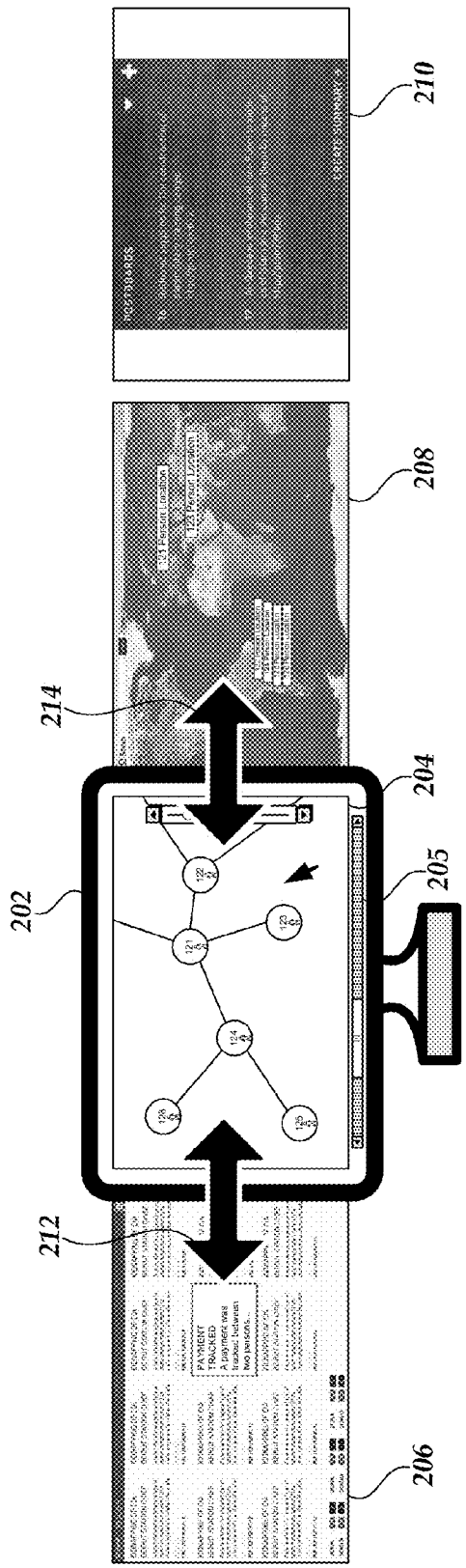

FIGS. 2A and 2B illustrate another example user interface of the context-sensitive viewing system including multiple contextual views, according to embodiments of the present disclosure. FIG. 2A includes a display 202 (for example, an electronic display associated with an electronic device), a scrollbar 205, and contextual views 204, 206, 208, and 210 corresponding to a graphical view, reader view, map view, and postboard view, respectively. A user of the context-sensitive viewing system views the primary graphical view 204 on the display 202, while the other views are not visible. The user may scroll and/or swipe (as with a touch interface) between the various views, as indicated by arrows 212, 214. The user may optionally use scrollbar 205 for scrolling between views.

FIG. 2B illustrates the user using mouse cursor 216 to scroll from the graphical view 204 to the reader view 206. Additional or fewer views may be available to the user. Additionally, in various embodiments multiple views may be arranged in other dimensions. For example, views may be laid out in a two-dimensional arrangement of rows and columns, and the display 202 may include a vertical scrollbar in addition to the horizontal scrollbar. In another embodiment, multiple views may be arranged in a three-dimensional arrangement, or any other arrangement suitable for user interaction with the context-sensitive viewing system.

In the embodiment of FIGS. 2A-2B, the user may interact with and/or manipulate the current, primary view as described above. Changes to the primary view are reflected in the secondary, non-visible views automatically, as described above with respect to the contextual previews of FIGS. 2C-2D. Additionally, as described above, in various embodiments changes may not be implemented in the non-visible views until they become visible to the user. Alternatively, adjacent views to the primary view may be updated more frequently (e.g. in realtime as changes are made to the primary view), while changes to non-adjacent views are made less frequently or not at all (e.g., a view may not be updated until it is adjacent to the primary view). In other embodiments, all views may be updated concurrently, such as in realtime, periodically, or in response to certain events.

FIGS. 2C and 2D illustrate alternative scrollbars that may be implemented in the context-sensitive viewing system, according to embodiments of the present disclosure. The scrollbars of FIGS. 2C and 2D may be implemented, for example, in the place of scrollbar 205 of FIGS. 2A and 2B.

In FIG. 2C the scrollbar 220 includes markers (or tick marks) 222 that indicate the locations of the various contextual views. Additionally, when mouse cursor 218 is placed over the scrollbar 220, a contextual preview 224 pops up. The preview 224 thereby provides the user with an indication of the particular view available at that location. In various embodiments, either markers 222 or pop up contextual preview 224, or both or neither, may be included in scrollbar 220.

In FIG. 2D the scrollbar includes contextual previews 230, 232, 234, and 236. A box indicator 228 indicates the currently viewable contextual view. For example, in FIG. 2D a graphical view corresponding to preview 232 is visible to the user. The user may use the mouse cursor 226 to move the indicator 228 along the scrollbar.

In an embodiment, multiple of the same type of contextual view may be accessible to the user. For example, timeline contextual views may be available.

Example Operations

Figure 3:
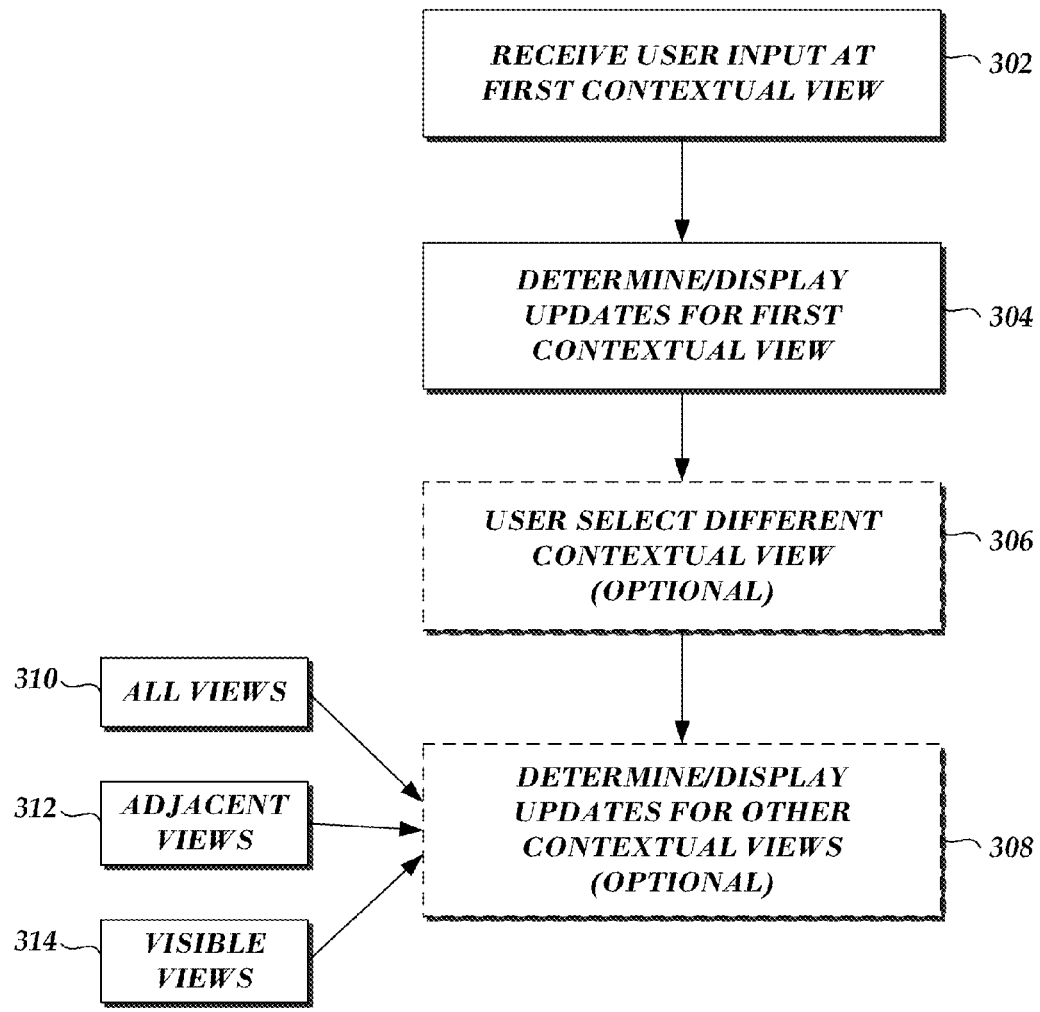
FIG. 3 is a flowchart depicting an illustrative operation of the context-sensitive viewing system, according to an embodiment of the present disclosure.

FIG. 3 is a flowchart depicting an illustrative operation of the context-sensitive viewing system, according to an embodiment of the present disclosure. In various embodiments, fewer blocks or additional blocks may be included in the process, or various blocks may be performed in an order different from that shown in FIG. 3. The various operations and functions described in FIG. 3 may, in various embodiments, be implemented by one or more modules of the context-sensitive viewing system.

At block 302, the context-sensitive viewing system receives user input at the first contextual view and/or data visualization user interface. In this present example, the first contextual view comprises the primary view with which the user is currently interacting. User inputs may include, for example, adding and/or deleting data objects, manipulating data objects, altering and/or editing data object properties and/or links, among other inputs.

At block 304, updates to the contextual view are determined by the context-sensitive viewing system based on the user input. For example, if the user provides an input to add a data object to the view, information associated with the data object to be added may be retrieved from a particular data store. The retrieved data object may then be displayed to the user and/or otherwise represented on the first/primary contextual view.

At block 306, the user may optionally select a different contextual view. Selecting a second contextual view may be accomplished in any of the ways described above in reference to the user interfaces of FIGS. 1A-1D and 2A-2D. For example, the user may drag objects from the first contextual view to a second contextual view. Alternatively, the user may click on or select a second contextual view. In another example, the user may scroll and/or slide the user interface to a second contextual view. In yet another embodiment, the user may drag one or more data objects onto another contextual view (as in the example of FIG. 1C). In an embodiment, block 306 may be optional. For example, in an embodiment, block 308 may follow block 304 without any user action.

At block 308, similar to block 304, updates to other contextual views may optionally be determined and displayed to the user. For example, when the user adds a data object to the first/primary contextual view, the same data object may be added to one or more other contextual views of the context-sensitive viewing system, as appropriate. In an example, when the user adds a person data object to a first graphical contextual view, the same person data object may be added to one or more other graphical contextual views. Further, the location(s) associated with that person data object may be added to one or more other map-based contextual views. Additionally, cables or other information, and/or user-generated snippets or notes associated with that person data object may be added to one or more other relevant contextual views.

The particular other contextual views that may be updated may depend on, for example, the particular implementation of the context-sensitive viewing system, user settings, and/or processing capability of the system. In an embodiment, at block 310, all other contextual views are updated simultaneously with, or very soon after, the updating of the first contextual. In another embodiment, at block 312, contextual views that are adjacent to the first view may be updated when the first view is updated. For example, in the embodiment of FIG. 2A, views that are immediately adjacent to the first, currently active view may be updated. Alternatively, views that are near the current view, for example, two or three away from the current view, may be updated. In yet another embodiment, at block 314, any visible contextual views may be updated. For example, in the preview drawer embodiment of FIG. 1D, or the scrollbar of FIG. 2D, any previews that are currently visible on the display may be updated. Alternatively, visible previews may be updated when the drawer is opened. In another alternative, hidden previews when the drawer is closed may be updated such that the updated previews may be visible when the drawer is opened. In another example, as in the embodiment of FIG. 2B, as the user scrolls or slides from one view to the next, the next view may be updated when it becomes visible to the user. In another example, as in the embodiment of FIG. 2C, the popup preview may be updated when it becomes visible to the user. Any combination of the above described examples may be implemented in the context-sensitive viewing system.

In an embodiment, updating of other contextual views is determined based on processing capability available to the context-sensitive viewing system. For example, additional contextual views may be updated when more processing capability is available. In another example, updates to particular contextual views may be delayed until visible to the user so as to reduce power consumption and/or processing power.

Implementation Mechanisms

Figure 4A:
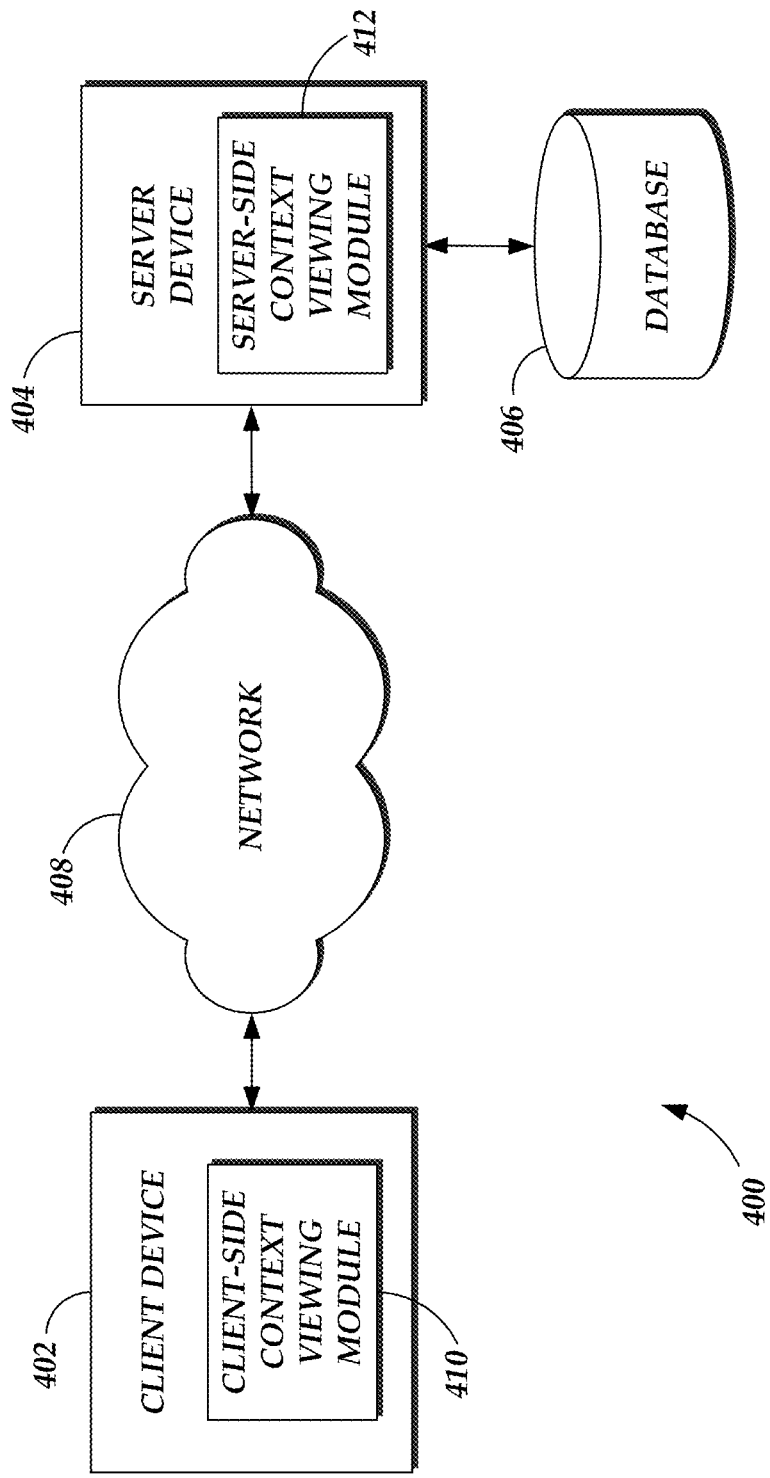
FIG. 4A illustrates a network environment in which the context-sensitive viewing system may operate, according to an embodiment of the present disclosure.

Turning to FIG. 4A, an illustrative network environment 400 in which the context-sensitive viewing system may operate, according to an embodiment of the present disclosure, is shown. The network environment 400 may include a client device 402, a network 408, a server device 404, and a database 406. The constituents of the network environment 400 may be in communication with each other either locally or over the network 408.

The client device 402 may be any computing device capable of receiving input and providing output to a user. For example, the client device 402 may provide a contextual view of a data visualization to the user, among other functions. The client device 402 may also be capable of communicating over the network 408, for example, to request data objects, data visualization information, and/or contextual view information from the server device 404. In some embodiments, the client device 402 may include non-transitory computer-readable medium storage for storing data objects, data visualization information, and/or contextual view information. In an embodiment, the context-sensitive viewing system may include a plurality of client devices, each of which may communicate with each other, and with the network 408.

The network 408 may be any wired network, wireless network, or combination thereof. In addition, the network 408 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The server device 404 is a computing device that may perform a variety of tasks to implement the contextual views and data visualizations of the context-sensitive viewing system. For example, the server device 404 may generate a user interface, including various contextual views, for display to the user via the client device 402. Alternatively, the server device 404 may receive requests for data and/or data objects from the client device 402, and may provide the requested data to the client device 402. The server device 404 may also generate requested data visualizations and/or contextual views that may be transmitted over the network 408, and provided to the user via the client device 402. Additional operations of the server device 404 and/or the client device 402 are described in further detail with respect to FIG. 4B.

The server device 404 may be in communication with the database 406. The database 406 may store one or more data objects, data visualization information, and/or contextual view information. The database 406 may be embodied in hard disk drives, solid state memories, and/or any other type of non-transitory, computer-readable storage medium remotely or locally accessible to the server device 404. The database 406 may also be distributed or partitioned across multiple storage devices as is known in the art without departing from the spirit and scope of the present disclosure.

FIG. 4A further illustrates that client device 402 includes a client-side context viewing module 410 and server device 404 includes a server-side context viewing module 412. Either of the context viewing modules 410, 412 may be configured to implement the various aspects of the context-sensitive viewing system as described herein. For example, in various embodiments, either of the context viewing modules 410, 412 may implement the user interface and/or various data visualizations and contextual views of the context-sensitive viewing system. As described in further detail in reference to FIG. 4B below, context viewing modules 410, 412 may comprise software, and may be stored in one or more computer-readable media of the client device 402 and/or server device 404. In other embodiments, context viewing modules 410, 412 may comprise hardware modules. Further, in various embodiments, context viewing modules 410, 412 may comprise additional modules that may implement the functionality of the context-sensitive viewing system. Functionality discussed above with reference to the client device and the server device may be changed to other devices (e.g., functions discussed with reference to the server device may be performed by the client device and/or vice versa) in various embodiments.

According to various embodiments, the techniques described herein may be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s), such as the client device 402 and/or the server device 404, are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, a computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4B:
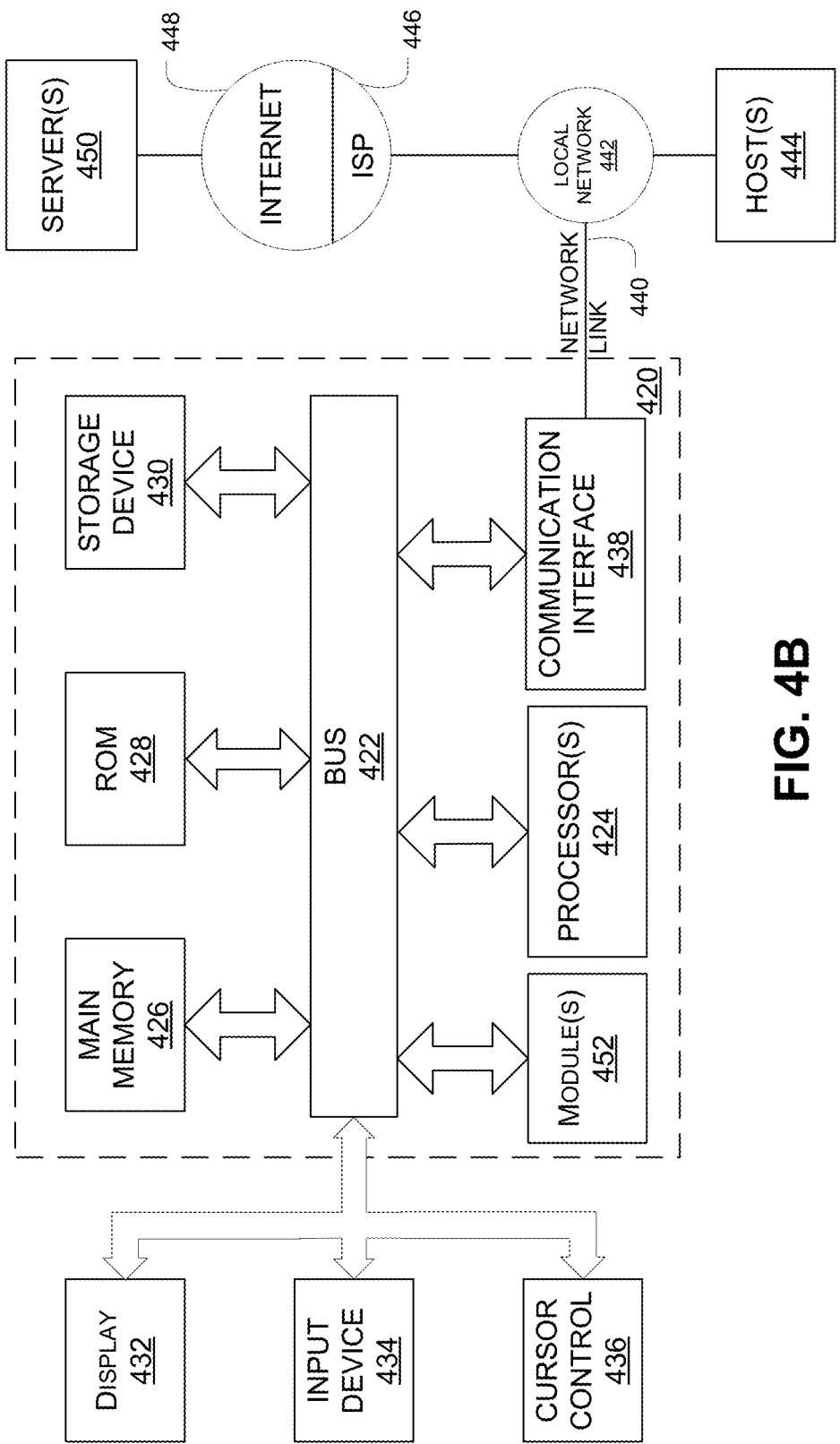
FIG. 4B illustrates a computer system with which certain methods discussed herein may be implemented, according to embodiments of the present disclosure.

For example, FIG. 4B is a block diagram that illustrates a computer system 420 upon which systems and methods discussed herein may be implemented. Computer system 420 includes a bus 422 or other communication mechanism for communicating information, and a hardware processor, or multiple processors, 424 coupled with bus 422 for processing information. Hardware processor(s) 424 may be, for example, one or more general purpose microprocessors. In various embodiments, one or more components of the computer system 420 may be included in the client device 402 and/or the server device 404 of FIG. 4A. In an embodiment, the client device 402 may be embodied in the computer system 420, while in another embodiment the server device 404 may be embodied in the computer system 420.

Computer system 420 also includes a main memory 426, such as a random access memory (RAM), cache and/or other dynamic storage devices, coupled to bus 422 for storing information and instructions to be executed by processor 424. Main memory 426 also may be used for storing temporary variables or other intermediate information during execution of instructions to be executed by processor 424. Such instructions, when stored in storage media accessible to processor 424, render computer system 420 into a special-purpose machine that is customized to perform the operations specified in the instructions.

Computer system 420 further includes a read only memory (ROM) 428 or other static storage device coupled to bus 422 for storing static information and instructions for processor 424. A storage device 430, such as a magnetic disk, optical disk, or USB thumb drive (Flash drive), etc., is provided and coupled to bus 422 for storing information and instructions.

Computer system 420 may be coupled via bus 422 to a display 432, such as a cathode ray tube (CRT) or LCD display (or touch screen), for displaying information to a computer user. An input device 434, including alphanumeric and other keys, is coupled to bus 422 for communicating information and command selections to processor 424. Another type of user input device is cursor control 436, such as a mouse, a trackball, or cursor direction keys for communicating direction information and command selections to processor 424 and for controlling cursor movement on display 432. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computer system 420 may also include one or more modules 452 that may, as described above and below, provide various functionality of the context-sensitive viewing system. For example, one module 452 may comprise the client-side context viewing module 410 of FIG. 4A, and may implement a graphical user interface on the client device 402. Module(s) 452 may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 420 may implement the techniques described herein using customized hard-wired logic, one or more ASICs or FPGAs, firmware and/or program logic which in combination with the computer system causes or programs computer system 420 to be a special-purpose machine. According to one embodiment, the techniques herein are performed by computer system 420 in response to processor(s) 424 executing one or more sequences of one or more instructions contained in main memory 426. Such instructions may be read into main memory 426 from another storage medium, such as storage device 430. Execution of the sequences of instructions contained in main memory 426 causes processor(s) 424 to perform the process steps described herein. In alternative embodiments, hard-wired circuitry may be used in place of or in combination with software instructions.

The terms "non-transitory media," "computer-readable media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 430. Volatile media includes dynamic memory, such as main memory 426. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 422. Transmission media can also take the form of acoustic or light waves, such as those generated during radio-wave and infra-red data communications.

Various forms of media may be involved in carrying one or more sequences of one or more instructions to processor 424 for execution. For example, the instructions may initially be carried on a magnetic disk or solid state drive of a remote computer. The remote computer can load the instructions into its dynamic memory and send the instructions over a telephone line using a modem. A modem local to computer system 420 can receive the data on the telephone line and use an infra-red transmitter to convert the data to an infra-red signal. An infra-red detector can receive the data carried in the infra-red signal and appropriate circuitry can place the data on bus 422. Bus 422 carries the data to main memory 426, from which processor 424 retrieves and executes the instructions. The instructions received by main memory 426 may retrieve and execute the instructions. The instructions received by main memory 426 may optionally be stored on storage device 430 either before or after execution by processor 424.

Computer system 420 also includes a communication interface 438 coupled to bus 422. Communication interface 438 provides a two-way data communication coupling to a network link 440 that is connected to a local network 442. For example, communication interface 438 may be an integrated services digital network (ISDN) card, cable modem, satellite modem, or a modem to provide a data communication connection to a corresponding type of telephone line. As another example, communication interface 438 may be a local area network (LAN) card to provide a data communication connection to a compatible LAN (or WAN component to communicate with a WAN). Wireless links may also be implemented. In any such implementation, communication interface 438 sends and receives electrical, electromagnetic or optical signals that carry digital data streams representing various types of information.

Network link 440 typically provides data communication through one or more networks (for example, network 408 of FIG. 4A) to other data devices. For example, network link 440 may provide a connection through local network 442 to a host computer 444 or to data equipment operated by an Internet Service Provider (ISP) 446. ISP 446 in turn provides data communication services through the world wide packet data communication network now commonly referred to as the "Internet" 448. Local network 442 and Internet 448 both use electrical, electromagnetic or optical signals that carry digital data streams. The signals through the various networks, on network link 440, and through communication interface 438, which carry the digital data to and from computer system 420, are example forms of transmission media.

Computer system 420 can send messages and receive data, including program code, through the network(s), network link 440 and communication interface 438. In the Internet example, a server 450 might transmit a requested code for an application program through Internet 448, ISP 446, local network 442 and communication interface 438.

The received code may be executed by processor 424 as it is received, and/or stored in storage device 430, or other non-volatile storage for later execution.

In an embodiment, the context-sensitive viewing system is implemented by the computer system 420. For example, data objects, data visualization information, and/or contextual view information may be stored in the storage device 430, and/or in an external database accessible through the local network 442 (for example, database 406 of FIG. 4A). The user interfaces and/or operations of the context-sensitive viewing system may be implemented by modules 452 stored in the main memory 426, the ROM 428, and/or the storage device 430, and executed by the processor(s) 424.

The context-sensitive viewing system advantageously enables a user to view a particular set of data objects in multiple visualization contexts. Previews of the set of data in other visualization may be quickly reviewed by the user to determine the most beneficial context for information extraction. Further, manipulations by the user in one context are propagated to the other contexts, allowing fast analysis of the impacts of changes to the set of data.

Object Centric Data Model

Figure 5:
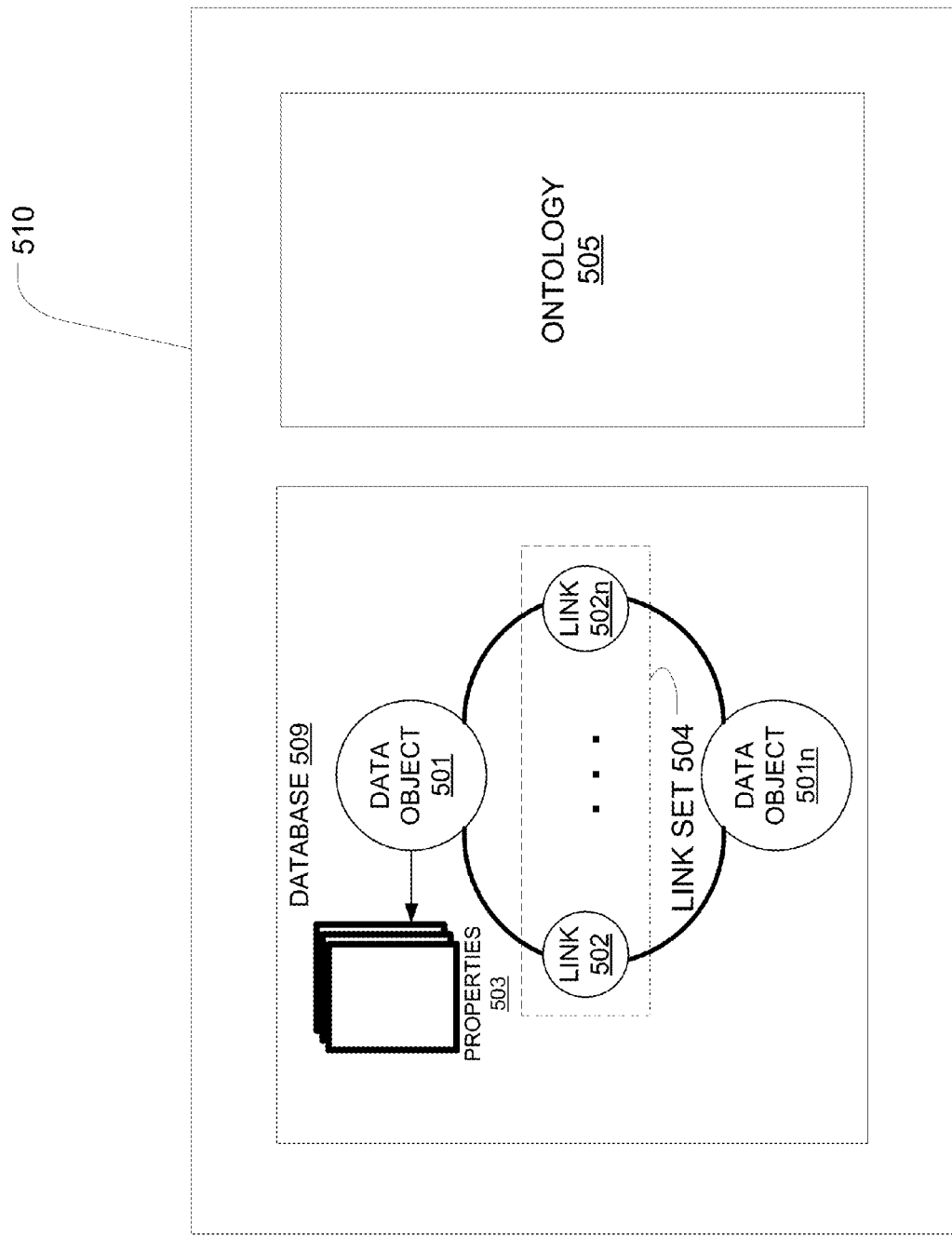
FIG. 5 illustrates an embodiment of a database system using an ontology.

FIG. 5 illustrates an object-centric conceptual data model including an example database system 510 using an ontology 505. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 505. The conceptual data model is independent of any particular database used for durably storing one or more database(s) 509 based on the ontology 505. For example, each object of the conceptual data model may correspond to one or more rows in a relational database or an entry in Lightweight Directory Access Protocol (LDAP) database, or any combination of one or more databases.

An ontology 505, as noted above, may include stored information providing a data model for storage of data in the database 509. The ontology 505 may be defined by one or more object types, which may each be associated with one or more property types. At the highest level of abstraction, data object 501 is a container for information representing things in the world. For example, data object 501 can represent an entity such as a person, a place, an organization, a market instrument, or other noun. Data object 501 can represent an event that happens at a point in time or for a duration. Data object 501 can represent a document or other unstructured data source such as an e-mail message, a news report, or a written paper or article. Each data object 501 is associated with a unique identifier that uniquely identifies the data object within the database system.

Different types of data objects may have different property types. For example, a "Person" data object might have an "Eye Color" property type and an "Event" data object might have a "Date" property type. Each property 503 as represented by data in the database system 510 may have a property type defined by the ontology 505 used by the database 505.

Objects may be instantiated in the database 509 in accordance with the corresponding object definition for the particular object in the ontology 505. For example, a specific monetary payment (e.g., an object of type "event") of US$30.00 (e.g., a property of type "currency") taking place on Mar. 27, 2009 (e.g., a property of type "date") may be stored in the database 509 as an event object with associated currency and date properties as defined within the ontology 505.

The data objects defined in the ontology 505 may support property multiplicity. In particular, a data object 501 may be allowed to have more than one property 503 of the same property type. For example, a "Person" data object might have multiple "Address" properties or multiple "Name" properties.

Each link 502 represents a connection between two data objects 501. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 501 can have multiple links with another data object 501 to form a link set 504. For example, two "Person" data objects representing a husband and a wife could be linked through a "Spouse Of" relationship, a matching "Address" property, and one or more matching "Event" properties (e.g., a wedding). Each link 502 as represented by data in a database may have a link type defined by the database ontology used by the database.

Figure 6:
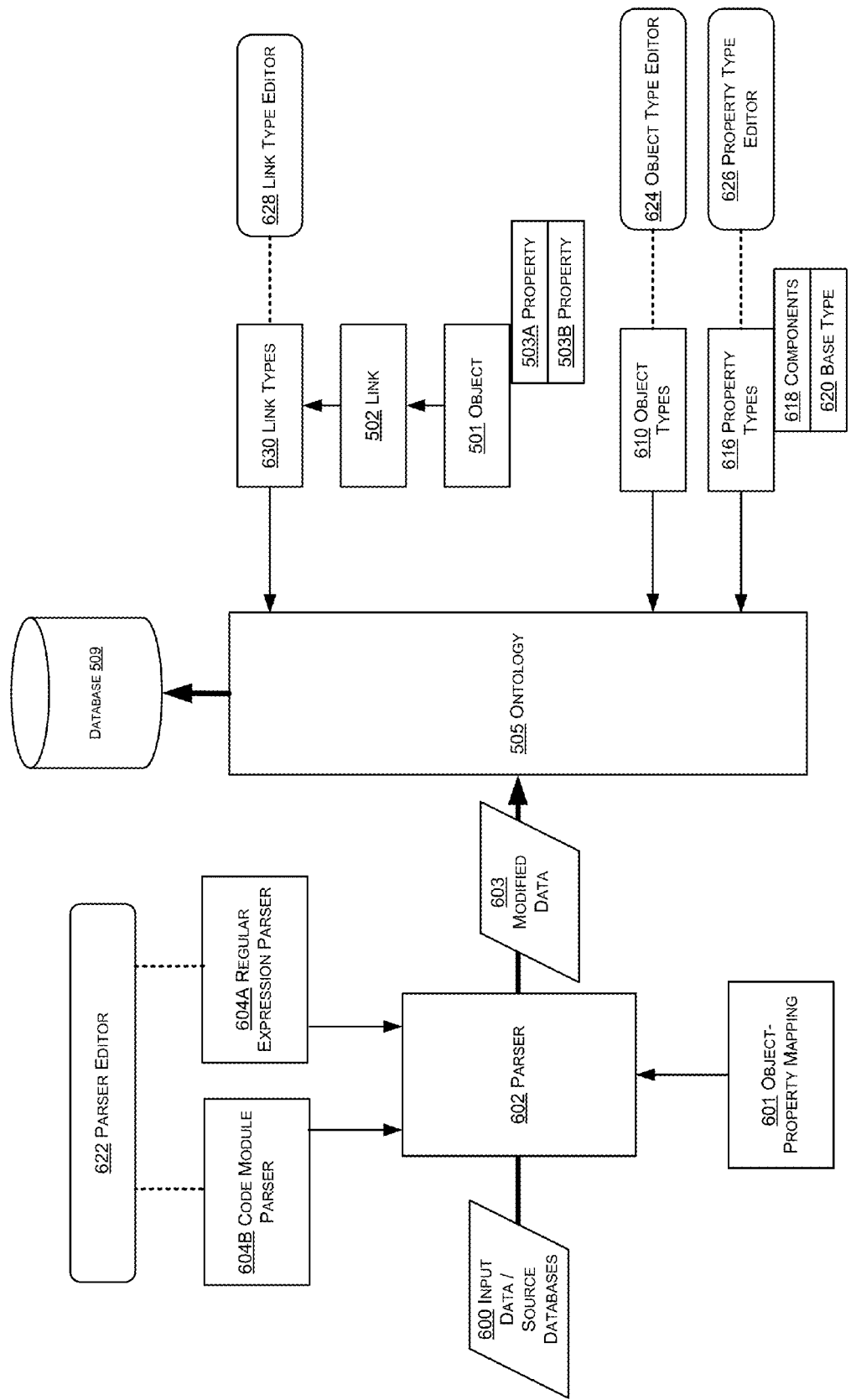
FIG. 6 illustrates an embodiment of a system for creating data in a data store using a dynamic ontology.

FIG. 6 is a block diagram illustrating exemplary components and data that may be used in identifying and storing data according to an ontology. In this example, the ontology may be configured, and data in the data model populated, by a system of parsers and ontology configuration tools. In the embodiment of FIG. 6, input data 600 is provided to parser 602. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 602 is able to read a variety of source input data types and determine which type of data it is reading.

In accordance with the discussion above, the example ontology 505 comprises stored information providing the data model of data stored in database 509, and the ontology is defined by one or more object types 610, one or more property types 616, and one or more link types 630. Based on information determined by the parser 602 or other mapping of source input information to object type, one or more data objects 501 may be instantiated in the database 509 based on respective determined object types 610, and each of the objects 501 has one or more properties 503 that are instantiated based on property types 616. Two data objects 501 may be connected by one or more links 502 that may be instantiated based on link types 630. The property types 616 each may comprise one or more data types 618, such as a string, number, etc. Property types 616 may be instantiated based on a base property type 620. For example, a base property type 620 may be "Locations" and a property type 616 may be "Home."

In an embodiment, a user of the system uses an object type editor 624 to create and/or modify the object types 610 and define attributes of the object types. In an embodiment, a user of the system uses a property type editor 626 to create and/or modify the property types 616 and define attributes of the property types. In an embodiment, a user of the system uses link type editor 628 to create the link types 630. Alternatively, other programs, processes, or programmatic controls may be used to create link types and property types and define attributes, and using editors is not required.

In an embodiment, creating a property type 616 using the property type editor 626 involves defining at least one parser definition using a parser editor 622. A parser definition comprises metadata that informs parser 602 how to parse input data 600 to determine whether values in the input data can be assigned to the property type 616 that is associated with the parser definition. In an embodiment, each parser definition may comprise a regular expression parser 604A or a code module parser 604B. In other embodiments, other kinds of parser definitions may be provided using scripts or other programmatic elements. Once defined, both a regular expression parser 604A and a code module parser 604B can provide input to parser 602 to control parsing of input data 600.

Using the data types defined in the ontology, input data 600 may be parsed by the parser 602 determine which object type 610 should receive data from a record created from the input data, and which property types 616 should be assigned to data from individual field values in the input data. Based on the object-property mapping 601, the parser 602 selects one of the parser definitions that is associated with a property type in the input data. The parser parses an input data field using the selected parser definition, resulting in creating new or modified data 603. The new or modified data 603 is added to the database 509 according to ontology 505 by storing values of the new or modified data in a property of the specified property type. As a result, input data 600 having varying format or syntax can be created in database 509. The ontology 505 may be modified at any time using object type editor 624, property type editor 626, and link type editor 628, or under program control without human use of an editor. Parser editor 622 enables creating multiple parser definitions that can successfully parse input data 600 having varying format or syntax and determine which property types should be used to transform input data 600 into new or modified input data 603.

The properties, objects, and links (e.g. relationships) between the objects can be visualized using a graphical user interface (GUI). For example, as described above, FIG. 1A displays a user interface showing a graph representation of relationships between the data objects that are represented as nodes. Further, as described above, relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

Additional Implementation Details

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
one or more hardware processors in communication with a computer readable medium storing software modules including instructions that are executable by the one or more hardware processors, the software modules including at least:
an electronic database configured to store a plurality of data objects and properties associated with each of the data objects; and
a context viewing module configured to:
generate a primary contextual view including a visualization of a set of data objects and associated properties, the visualization comprising: a graph, a map, a table, a timeline, a histogram, a list, a reader interface, or a postboard interface, or combinations thereof;
generate one or more secondary contextual views distinct from the primary contextual view, each secondary contextual view including respective secondary visualizations, distinct from the visualization, of the set of data objects, the secondary visualizations comprising at least one of: a graph, a map, a table, a timeline, a histogram, a list, a reader interface, or a postboard interface, or combinations thereof;
receive a user input modifying the primary contextual view, wherein the user input modifying the primary contextual view comprises at least one of: adding data objects to the set of data objects, removing data objects from the set of data objects, modifying data objects in the set of data objects, moving data objects in the set of data objects, modifying properties associated with data objects in the set of data objects, or modifying and/or manipulating links between data objects in the set of data objects;
in response to receiving the user input modifying the primary contextual view, modify a first adjacent secondary contextual view and a second adjacent secondary contextual view of the one or more of the secondary contextual views, based at least in part on the user input; and
in response to receiving the user input modifying the primary contextual view, modify a first adjacent secondary contextual preview representing a smaller version of the first adjacent secondary contextual view, and modify a second adjacent secondary contextual preview representing a smaller version of the second adjacent secondary contextual view,
wherein the context viewing module is configured to display the first adjacent secondary contextual preview when a location indicator is positioned above a first portion of a scrollbar associated with the first adjacent secondary contextual view, and display the second adjacent secondary contextual preview when the location indicator is positioned above a second portion of the scrollbar associated with the second adjacent secondary contextual view.

2. The computer system of claim 1, wherein the context viewing module is further configured to:
in response to receiving the user input modifying the primary contextual view, determine additional secondary contextual views the one or more of the secondary contextual views to modify; and
modify the additional secondary contextual views based at least in part on the user input.

3. The computer system of claim 2, wherein the additional secondary contextual views comprises all of the one or more secondary contextual views.

4. The computer system of claim 2, wherein modifying one or more the additional secondary contextual views comprise any of the one or more secondary contextual views that are currently viewable by a user.

5. The computer system of claim 2, wherein modifying one or more the additional secondary contextual views comprise any of the one or more secondary contextual views that are adjacent to the first and second adjacent secondary contextual views.

6. The computer system of claim 1, wherein the one or more secondary contextual views are viewable in a drawer or scrollbar on a user interface, wherein the one or more secondary contextual views are selectable by a user.

7. The computer system of claim 1, wherein the one or more secondary contextual views are substantially the same size as the primary contextual view.

8. The computer system of claim 7, wherein the one or more secondary contextual views are configured to be accessible by a user through the use of the scrollbar.

9. The computer system of claim 8, wherein the scrollbar includes at least one of tick marks indicating the locations of the one or more secondary views or contextual previews accessible in pop up windows, wherein the tick marks indicate the first and second portions of the scrollbar.

10. The computer system of claim 7, wherein the one or more secondary contextual views are positioned laterally to the primary contextual view, and wherein the secondary contextual views are accessible by a user through a user input including at least one of a mouse cursor or a touch input.

11. A computer system comprising:
one or more hardware processors in communication with a computer readable medium storing software modules including instructions that are executable by the one or more hardware processors, the software modules including at least a context viewing module configured to:
display a first data visualization of a set of data objects and properties associated with data objects of the set of data objects, the first data visualization comprising: a graph, a map, a table, a timeline, a histogram, a list, a reader interface, or a postboard interface, or combinations thereof;
provide one or more secondary data visualizations of the set of data objects, the one or more secondary data visualizations distinct from the first data visualization, the secondary data visualizations comprising at least one of: a graph, a map, a table, a timeline, a histogram, a list, a reader interface, or a postboard interface, or combinations thereof;
receive a user input modifying the first data visualization, wherein the user input modifying the first data visualization comprises at least one of: adding data objects to the set of data objects, removing data objects from the set of data objects, modifying data objects in the set of data objects, moving data objects in the set of data objects, modifying properties associated with data objects in the set of data objects, or modifying and/or manipulating links between data objects in the set of data objects; and
in response to receiving the user input modifying the first data visualization, implement modifications to at least a first adjacent secondary data visualization and a second adjacent secondary data visualizations of the one or more secondary data visualizations based at least in part on the user input; and
in response to receiving the user input modifying the first data visualization, implement modifications to a first adjacent secondary data visualization preview representing a smaller version of the first adjacent secondary data visualization, and modify a second adjacent secondary data visualization preview representing a smaller version of the second adjacent secondary data visualization,
wherein the context viewing module is configured to display the first adjacent secondary data visualization preview when a location indicator is positioned above a first portion of a scrollbar associated with the first adjacent secondary data visualization, and display the second adjacent secondary data visualization preview when the location indicator is positioned above a second portion of the scrollbar associated with the second adjacent secondary data visualization.

12. The computer system of claim 11, wherein the context viewing module is further configured to:
in response to receiving the user input modifying the first data visualization:
determine which of the one or more of the secondary data visualizations are currently displayed to the user, and
implement modifications to the determined secondary data visualizations based at least in part on the user input.

13. The computer system of claim 11, wherein the context viewing module is further configured to:
in response to receiving the user input modifying the first data visualization:
determine which of the one or more of the secondary data visualizations are adjacent to the first and second adjacent secondary data visualizations, and
implement modifications to the determined secondary data visualizations based at least in part on the user input.

14. A computer-implemented method of updating multiple contextual views, the method comprising:
providing an electronic database configured to store a plurality of data objects and metadata associated with each of the plurality of data objects;
generating, by a computing system having one or more computer processors, based at least in part on the plurality of data objects and associated metadata, a primary contextual view and one or more secondary contextual views distinct from the primary contextual view, each of the primary and one or more secondary contextual views comprising at least one of: a graph, a map, a table, a timeline, a histogram, a list, a reader interface, or a postboard interface, or combinations thereof;

receiving, via an input device of the computing system, a user input modifying the primary contextual view, wherein the user input modifying the primary contextual view comprises at least one of: adding data objects to the set of data objects, removing data objects from the set of data objects, modifying data objects in the set of data objects, moving data objects in the set of data objects, modifying properties associated with data objects in the set of data objects, or modifying and/or manipulating links between data objects in the set of data objects;

in response to receiving the user input, determining, by the computing system, based on the received user input, modifications of the one or more secondary contextual views that correspond to the modification of the primary contextual view; and in response to determining the modifications:
modifying at least a first adjacent secondary contextual view and a second adjacent secondary contextual view of the one or more secondary contextual views based on the determined modifications; and
modifying at least a first adjacent secondary contextual preview representing a smaller version of the first adjacent secondary contextual view, and modify a second adjacent secondary contextual preview representing a smaller version of the second adjacent secondary contextual view,
wherein the first adjacent secondary contextual preview is displayed when a location indicator is positioned above a first portion of a scrollbar associated with the first adjacent secondary contextual view, and the second adjacent secondary contextual preview is displayed when the location indicator is positioned above a second portion of the scrollbar associated with the second adjacent secondary contextual view.

15. The computer-implemented method of claim 14, further comprising:
providing, on an electronic display of the computing system, the generated primary contextual view and, in a preview drawer, at least one of the one or more secondary contextual views, the first adjacent secondary contextual preview, or the second adjacent secondary contextual preview.

16. The computer-implemented method of claim 14, further comprising:
providing, on an electronic display of the computing system, the generated primary contextual view; and
providing, on the electronic display of the computer system, the scrollbar that enables a user to scroll to any of the one or more of the secondary contextual views and view any of the one or more of the secondary contextual views on the electronic display.

17. The computer-implemented method of claim 14 further comprising:
in response to determining the modifications:
modifying any secondary contextual views that are immediately viewable by a user.

18. A non-transitory computer readable storage medium storing computer-executable instructions configured for execution by one or more hardware processors of a computer system to cause the computer system to:
communicate with an electronic database configured to store a plurality of data objects and properties associated with each of the data objects;
generate a primary contextual view including a visualization of a set of data objects and associated properties, the visualization comprising: a graph, a map, a table, a timeline, a histogram, a list, a reader interface, or a postboard interface, or combinations thereof;
generate one or more secondary contextual views distinct from the primary contextual view, each secondary contextual view including respective secondary visualizations, distinct from the visualization, of the set of data objects, the secondary visualizations comprising at least one of: a graph, a map, a table, a timeline, a histogram, a list, a reader interface, or a postboard interface, or combinations thereof;
receive a user input modifying the primary contextual view, wherein the user input modifying the primary contextual view comprises at least one of: adding data objects to the set of data objects, removing data objects from the set of data objects, modifying data objects in the set of data objects, moving data objects in the set of data objects, modifying properties associated with data objects in the set of data objects, or modifying and/or manipulating links between data objects in the set of data objects;
in response to receiving the user input modifying the primary contextual view, modify a first adjacent secondary contextual view and a second adjacent secondary contextual view of the one or more of the secondary contextual views, based at least in part on the user input; and
in response to receiving the user input modifying the primary contextual view, modify a first adjacent secondary contextual preview representing a smaller version of the first adjacent secondary contextual view, and modify a second adjacent secondary contextual preview representing a smaller version of the second adjacent secondary contextual view,
wherein the first adjacent secondary contextual preview is displayed when a location indicator is positioned above a first portion of a scrollbar associated with the first adjacent secondary contextual view, and the second adjacent secondary contextual preview is displayed when the location indicator is positioned above a second portion of the scrollbar associated with the second adjacent secondary contextual view.

* * * * *

UNITED STATES PATENT AND TRADEMARK OFFICE
CERTIFICATE OF CORRECTION

| | | |
|---|---|---|
| PATENT NO. | : 8,713,467 B1 | Page 1 of 1 |
| APPLICATION NO. | : 14/095798 | |
| DATED | : April 29, 2014 | |
| INVENTOR(S) | : Goldenberg et al. | |

It is certified that error appears in the above-identified patent and that said Letters Patent is hereby corrected as shown below:

In column 2 (title page 2, item 56) at line 10, Under Other Publications, change ""Paramater" to --Parameter--.

In the Specification:

In column 14 at line 36, Change "storage" to --storage.--.

In the Claims:

In column 21 at line 17, In Claim 2, after "views" insert --of--.

In column 21 at line 22, In Claim 3, change "comprises" to --comprise--.

In column 21 at lines 24-25, In Claim 4, after "wherein" delete "modifying one or more".

In column 21 at lines 28-29, In Claim 5, after "wherein" delete "modifying one or more".

Signed and Sealed this
Thirtieth Day of September, 2014

Michelle K. Lee
*Deputy Director of the United States Patent and Trademark Office*